Figure 7:
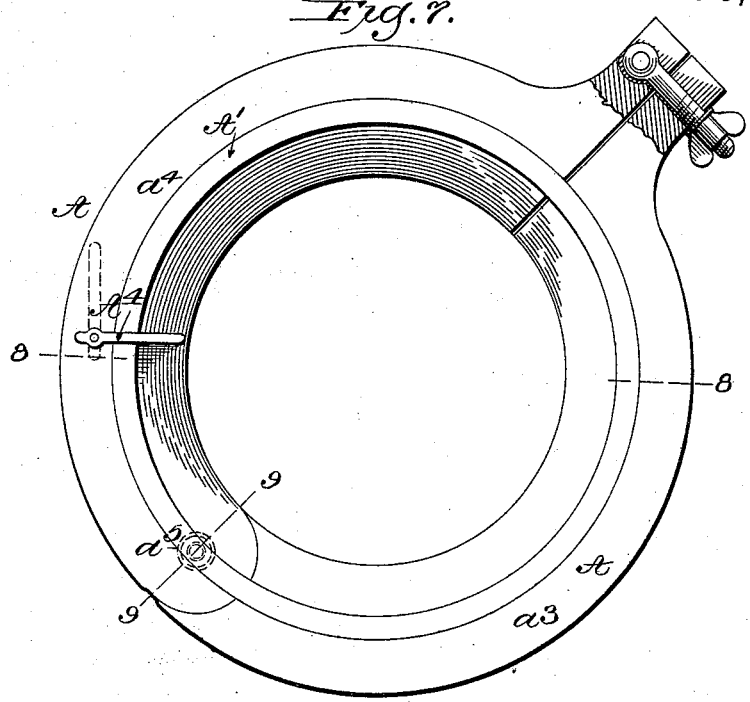

(No Model.) 2 Sheets—Sheet 1.
W. W. STALL & J. T. WALTON.
APPARATUS FOR MAKING WOOD RIMS OR BANDS.
No. 555,625. Patented Mar. 3, 1896.
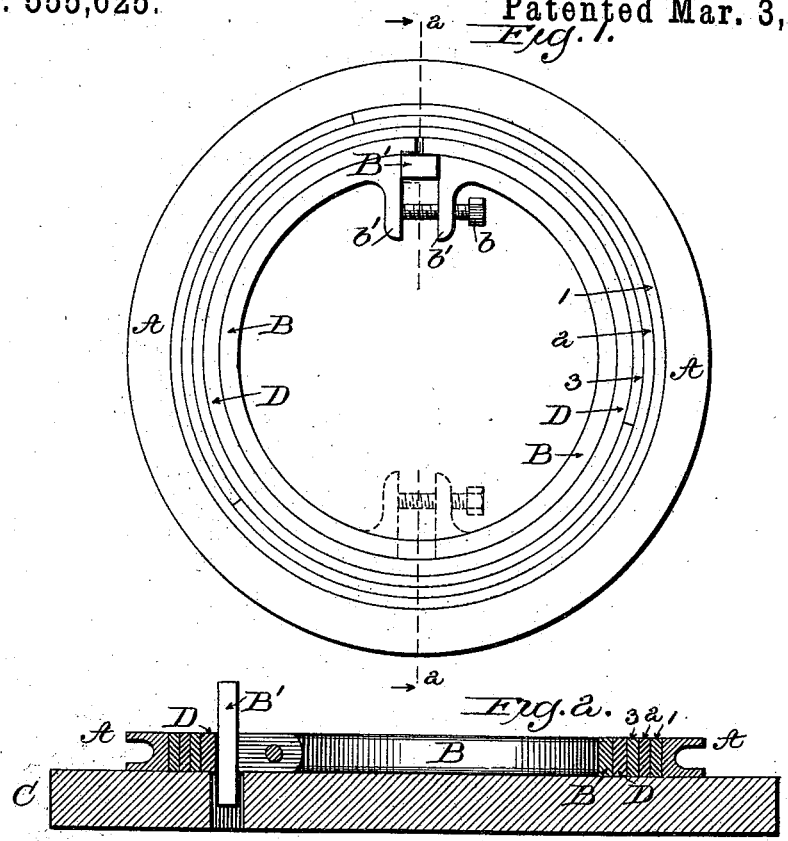
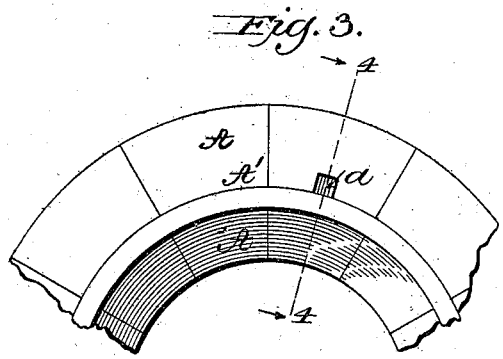
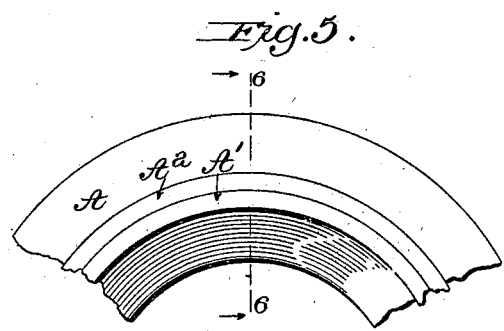
Witnesses
Arthur Ashley
R. H. Banks
Inventors
William W. Stall
James T. Walton
by C. A. Neale
Attorney (No Model.) 2 Sheets—Sheet 2.

W. W. STALL & J. T. WALTON.
APPARATUS FOR MAKING WOOD RIMS OR BANDS.

No. 555,625. Patented Mar. 3, 1896.

Witnesses
Arthur Ashley
K. H. Banks

Inventors
William W. Stall
James T. Walton
by
Attorney

UNITED STATES PATENT OFFICE.

WILLIAM W. STALL, OF BOSTON, AND JAMES T. WALTON, OF EVERETT, MASSACHUSETTS; SAID WALTON ASSIGNOR TO SAID STALL, AND SAID STALL ASSIGNOR TO THE BOSTON WOOD RIM COMPANY, OF BEDFORD, MASSACHUSETTS.

APPARATUS FOR MAKING WOOD RIMS OR BANDS.

SPECIFICATION forming part of Letters Patent No. 555,625, dated March 3, 1896.

Application filed March 29, 1894. Serial No. 505,623. (No model.)

*To all whom it may concern:*

Be it known that we, WILLIAM W. STALL, of Boston, in the county of Suffolk, and JAMES T. WALTON, of Everett, in the county of Middlesex, State of Massachusetts, have invented certain new and useful Improvements in Methods of and Apparatus for Making Wooden Wheel-Rims, of which the following, taken in connection with the accompanying drawings, is a specification.

This invention relates to the art of and apparatus for making wood rims or bands, such, for instance, as fellies for wheels, band-saw pulleys, banjo-rims, &c.

In constructing wood rims or bands, and more particularly that class of bands or rims designed for use on bicycle-wheels, in which rim-blanks are commonly used of a length equal to or greater than the circumference of the finished felly, it has been customary, so far as we are aware, to coil the blank or blanks upon a die or mandrel, the outer plies or laps of "built up" or multiply rims being coiled upon the inner ones. This method of manufacturing does not produce the best results, for the reason, among others, that rims so made are apt to vary in exterior circumference and also to depart from a true circle exteriorly, and for the further reason that the natural spring of the wood tends to separate the outer plies (in multiply rims) from the next inner ones. Moreover, owing to the extreme difficulty of effecting the diminution or contraction of the respective circles represented by the respective plies or layers of a multiply rim uniformly, the cementation of the respective plies to each other is apt to be imperfect.

The object of this invention is to avoid or cure the above-noted and other objections.

With this object in view the invention consists in forming a rim by coiling a blank or blanks within a suitable die or mold, then distending said blank or blanks (properly cemented) annularly by outward pressure exerted uniformly throughout the entire circumference of said blank or blanks.

The invention further consists in the combination, with a female die, of a male die, the working surface of which will maintain a concentric relation with the female die under working adjustment, whereby the blank or blanks will be distended annularly within the female die by a pressure distributed evenly and uniformly at all points so that the blank or blanks under operation will not be confined at any one point between the male and female dies, but will be free to move circularly or "creep" between the opposing die-surfaces up to the limit of distension permitted by the female die.

Figure 8:
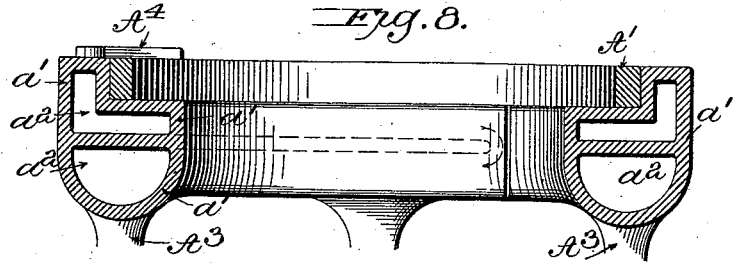
Figure 9:
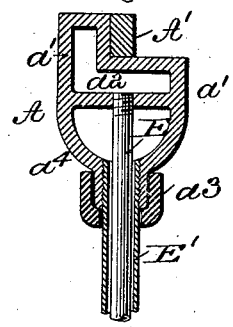

In the accompanying drawings, wherein are illustrated various arrangements of devices embodying the principles of the invention, Figure 1 is a plan view of one form of apparatus embodying this invention. Fig. 2 is a section thereof taken on line 2 2 of Fig. 1. Figs. 3 and 5 are plan views of so much of apparatus embodying our invention as to illustrate modifications therein. Fig. 4 is a section on line 4 4 of Fig. 5. Fig. 6 is a section on line 6 6 of Fig. 5. Fig. 7 is a plan view illustrating further modifications of the female die. Fig. 8 is a section on line 8 8 of Fig. 7. Fig. 9 is a section on line 9 9 of Fig. 7.

In practical manufacture of multiply rims or bands in accordance with this invention each rim-blank 1 2 3, &c., should be dressed to an even thickness throughout its length, and as we prefer to employ a lap-splice for the ends of the respective blanks they are correspondingly scarfed or feathered at the ends, so that when the blanks are coiled and distended in a circular female die the overlapping scarfed ends thereof will be jointly of substantially the same thickness as the body of the blank. The scarfing of the ends of the blanks, however, is not essential, as the operation of forming rims in accordance with our invention may be practiced with butt-ended blanks.

The outermost blank or ply, 1, of the rim is coiled within the circular die seat or surface of a female die, then a second blank or ply, 2, is coiled within the first or outermost one, 1, and preferably in such manner as to break joints with the first one, and so on until the desired number of blanks or plies are coiled, each ply preferably breaking joints with all others. To the inner surface of the outer ply and the outer surface of the inner ply and to both surfaces of the intermediate plies is applied a coating of suitable cement or glue to cause the plies to be held together to form a single composite whole. For convenience of handling, the cement is preferably applied to the blanks just before they are coiled within the female die, and we prefer to heat the blanks and apply the cement while hot, as this renders the blanks more pliable, so that the succeeding manipulations are more easily performed and the adjacent surfaces of adjacent plies are more perfectly and tightly fitted together, thus forming a more perfect rim.

In forming rims of small diameter—such as banjo-rims and the like, especially when light stock is used—it is entirely practicable to distend the blanks within the female die by suitable manipulations and pressure of the hands, the blanks being rendered yielding or supple by heat and the moisture of the cement, so that they may be readily distended circularly. In this manner small light rims can be very rapidly assembled, but during the drying operation we prefer to employ suitable mechanical clamps to hold the rim in its distended condition within the female die, as we thereby effect an economy in manual labor when using slow-drying cements.

In employing mechanism for the assemblage and shaping of rims after the necessary blanks or plies 1 2 3, &c., (three being here shown,) are coiled within the female die, a male die is inserted within the innermost blank or ply 3, and operated to force the rim-blanks outward toward the female die. This male die should be of such construction that in operation its entire working surface shall at all points present an arc parallel with the arc of the opposite female-die surface so that the outward pressure of the male die, while exerting its force radially, will not pinch or bind the blanks at any one point but permit their overlapping ends to slip past each other during distension and also permit each blank to slip or creep upon the adjacent surfaces of adjacent blanks, so that the pressure exerted in cementing the plies at any one point will be substantially the same as that exerted at all the other points throughout the circumference of the assembled blanks.

The elements or devices constituting the improved apparatus for carrying our invention into effect embrace a circular female die or mold A and an adjustable male die B, adapted to operate within the female die A, to exert an even or uniform pressure outward radially upon all parts of the rim-stock, the outer or female die, A, serving as a fixed circular abutment against the walls of which rib-bands or rim-stock, or blanks, may be forcibly pressed by the adjustable male die B.

For various reasons—such as freedom from warping and facility of manufacturing and handling—the female die A is preferably constructed of metal and may be in the form of a continuous ring or hoop, the inner circumference of which is equal to the desired exterior circumference of the fellies to be formed therein, though this is not essential, as said die A may be made in sections bound together to form a single whole.

The adjustable male die B may comprise any suitable or known form or arrangement of mechanical devices which will exert the required pressure outward radially upon all parts of the rim-stock simultaneously, such as a cone, operating centrally within the die A as a cone, operating centrally within the die A but supported independently of and adapted to be moved in the line of the axis of said die, or, as shown in Fig. 1, a stout metal ring, preferably of spring-steel, divided at one point, seated loosely in the die A, the adjoining ends of said ring being adapted to be thrust asunder by suitable means, such as a wedge B', which constitutes a continuation of the die-surface to increase the diameter of the ring or die B, as a whole, to exert a pressure outward radially toward the opposing circular wall of the female die A. The meeting or adjacent ends of this band-shaped die B are fitted with lugs or bosses $b'$, which may be formed integral with the band or secured thereto by rivets, said bosses being provided, one or both, with a tapped hole to receive the thrust-bolt or screw-bolt $b$. In practice both the wedge B' and screw $b$ have been used at one point with good effects, the one supplementing the other, so that greater force is obtained than would be possible with but the one device, and it will be apparent that other well-known mechanical devices—such as an eccentric or cam or rack and pinion—may be used in lieu of either the wedge or screw, or both.

In bending up and cementing the stock to form rims or bands it is important that the outward pressure exerted by the male die upon the stock to force it outward forcibly in contact with the die-surface of the female die shall be the same at all points throughout the entire circumference of the rim; in other words, that there shall not be at any one point a pressure in excess of that exerted at all other points, so that said stock throughout its entire circumference shall be free to adapt itself to the form of the female die. This should be specially observed in making up multiply rims or bands, as it is of the utmost importance that the several plies shall not be confined at any one point, but be free to creep and adjust themselves individually under the outward pressure of the male die, thus avoiding any lengthwise tension or compression which would tend to make the seams between plies insecure or the cemented plies, as a whole, uneven. For this reason, among others, the male die, formed of a steel band, as in Fig. 1, has given the best results in practice, as the thrusting of its ends asunder expands the die equally and simultaneously throughout its entire circumference, so that the outward pressure of said die upon the rim is applied equally at all parts of the rim and not at one or more points in excess of others. This leaves the several plies free to adjust themselves individually and with relation to each other and admits of tightly cementing the plies to each other at all points, notwithstanding slight unevenness of one or more of the plies. The wedge B' employed with the band-die B constitutes in effect a part or section of said die, inasmuch as it fills the gap or interval between the meeting ends of the die-ring and renders the outer peripheral or working surface of said die continuous or unbroken.

In Figs. 1 and 2, wherein the apparatus is illustrated in a simple, though practically operative form, the female die A consists of a solid ring or hoop of iron which may be secured to or supported upon any suitable base or stand C. This die must be of such proportions as to withstand great outward pressure, and has in practice been made of a width equal to that of the blank or blanks 1 2, &c., from which the rim is made (see Fig. 2) to afford facility for handling. The die A is turned or dressed interiorly to a true circle of any diameter it is desired to give the rim formed therein.

A liner or "caul" D is interposed between the male and female dies, its purpose being to prevent contact of the male die B with the innermost rim-blank. In practice this caul D has been formed of a strip of wood which is surfaced with soap, soapstone, or some other material to which the glue or cement used in building up the rim or fellies will not adhere, and which acts also as an antifriction-surfacing to provide for the sliding of the die-band B upon the adjacent surface of the caul during the distension of said die-band while said parts are pressed forcibly in contact.

After the layers or plies 1 2 3 &c., of a multiply rim are laid successively within the female die A a layer or film of cement or glue, preferably hot, being applied to those surfaces of the respective strips or blanks which are to come in contact with other blanks, the caul D and male die B are placed in position within the innermost blank, 3, and said die B is then distended to distend the blanks and press them tightly together, the outermost ply being confined by die A, and thus forms a multiply hoop conforming exactly in shape and diameter to the interior surface of the female die A. The outward pressure of the male die B, to attain the best results, should be sufficient to press all excess of cement from between the adjacent surfaces of the adjacent rim-blanks, leaving but a thin film of cement between said blanks, so that in the finished rim there will be no body or bodies or cement to be attacked by or subjected to moisture.

In the modified form of apparatus illustrated in Figs. 3 and 4 a supplementary die A' is seated within the annular recess or shoulder of the die proper, A, the latter in this instance being constructed to form the upper surface of a base or stand. The purpose of this arrangement is to admit of the coiling and cementing of the rim within the light portable die, as A', which may be removed with the cemented rim from the die proper, A, and put aside to permit the cement to set, while the die proper, A, is in use with another supplementary die, A', in forming additional rims. In this arrangement the die A may be provided at intervals with cavities $a$ to admit of the insertion of one leg or member of a series of clamps by means of which the cemented rim may be clamped to the supplemental die A' to avoid any possibility of the separation of the cemented plies from each other when released from the pressure of the male die B.

In the form of apparatus illustrated in Figs. 5 and 6 the supplemental die A' is separated from the vertical annular shoulder of the die A by a liner $A^2$, sectional or otherwise, the purpose of this arrangement being to admit of the use of supplemental dies A' of different diameter with a single die proper, A.

In making wooden rims it has been found advantageous, if not necessary, to heat the wood in order to render it pliable for coiling and also to avoid sudden chilling of the hot glue or cement used in making multiply rims. In the practical manufacture of these rims we have applied heat to the wooden stock or blanks by the use of heated dies A and B, and while these dies may be heated in any suitable way prior to the operation of coiling the blanks or stocks therein, we have devised a construction by which the dies, as also the material operated upon, may be heated *in situ* while undergoing operation.

One form of mechanical devices for carrying out this part of the invention is illustrated in Figs. 7 and 8, wherein the die proper, A, which supports the male and female dies and stock during the operation of coiling, is shown as provided with hollow walls $a'$ $a'$, which inclose an annular space or chamber $a^2$, through which steam may be circulated to heat the walls $a'$ $a'$, and thus impart the necessary heat to the dies A' and B and to the stock undergoing operation. The steam space or chamber $a^2$ is here shown as divided horizontally to form two passages, the upper one being connected with a steam-supply pipe E and the lower one with an exhaust-pipe E', so that a continuous current of live steam may be passed forward and back through the steamchamber $a^2$ to maintain the walls $a'$ thereof at the required temperature.

The die A (shown in Figs. 7 and 8) is in two parts, supported at a convenient height in any desirable manner—as, for instance, by the lags $A^3$. One part, $a^3$, of said die is stationary, while the other part, $a^4$, thereof is movable horizontally, so that a cemented rim, a die A', or a die and liner therein may be readily released for removal upon moving the part $a^4$ of the die proper, A, slightly apart from the stationary part $a^3$ thereof.

A convenient construction is shown in Fig. 7, the movable part $a^4$ being pivoted to the stationary part $a^3$ at one point $a^5$, and the two parts being provided at a point diametrically opposite the pivot $a^5$ with lugs adapted to be clamped together by a screw-bolt or otherwise. As so constructed a very slight movement of the movable part $a^4$ will serve to release the rim or the die A' and permit of the ready removal and replacement by another.

To avoid flexible joints in the steam supply and exhaust pipes E and E', connected with the movable part $a^4$ of the die A, they may be nested, as shown in the detail, Fig. 9, and lead up through the pivot $a^5$, a hollow supporting-leg preferably located at this point. The steam supply and exhaust of the fixed member $a^3$ of the die A may or may not be independent of that of the movable member $a^4$ and arranged as will best suit the convenience of the surroundings.

While the invention herein described is specially applicable to the manufacture of multiply wheel-rims for bicycles, sulkies, &c., it will be apparent that single lap or ply wheel rims or bands designed for other purposes may be made in accordance therewith, whether of single lap or multiply lap formed from a single blank or multiply lap formed from a plurality of blanks—as, for instance, the single or multiply bands for the band-wheels of band-sawing machines and the rims of banjos—in both of which structures it is desirable that the rims or bands have great strength to resist inward radial pressure, and that they maintain peripherally a true circular contour. It will also be understood that the invention applies to rims or bands made of material other than wood, such as paper-stock, fiber, &c.

We claim—

1. The improvement in the art of making wood rims which consists in coiling a blank or blanks properly cemented within a female die, then annularly distending said blanks evenly throughout their circumference and clamping the same within said female die by outward expansive pressure, substantially as described.

2. The improvement in the art of making wood rims which consists in coiling a properly-cemented blank or blanks within a female die, then annularly distending and clamping said blanks within the female die, in the presence of heat, by outward expansive pressure, substantially as described.

3. In an apparatus for making wood rims the combination with a circular female die within which rim-blanks are coiled of an annularly uniformly-expansible male die having a continuous circular periphery, substantially as described.

4. In an apparatus for making wood rims the combination with a female die having a circular die-surface within which rim-blanks are coiled of a flexible circular male die uniformly expansible annularly to expand the blanks annularly, within the limits of the female die and forcibly clamp them therein, substantially as described.

5. In an apparatus for making rims the combination with a circular female die within which rim-blanks are coiled of an annularly-expansible male die, adapted to maintain parallelism with the female die at all points consisting of a ring of metal divided at one point and means applied at such divided point to forcibly distend the ring annularly, substantially as described.

6. In an apparatus for making rims the combination with a circular female die within which blanks are coiled, of a ring-shaped male die divided at one point and a wedge applied between the ends of the divided ring to expand the die annularly and fill the gap between said ends, substantially as described.

7. In an apparatus for making rims the combination with a circular female die within which blanks are coiled, of a male die expansible annularly to maintain parallelism between its working face and that of the female die, consisting of a ring divided at one point, a wedge applied between the ends of the divided ring to distend the same and fill the gap between said ends, and a screw to supplement the force of the wedge, substantially as described.

8. In an apparatus for making rims the combination with a circular female die, of a supplementary circular female die seated in and removable from the first-named die, and an annularly uniformly-expansible male die consisting of a ring of metal divided at one point and means applied at such divided point to thrust the ends of the ring asunder, substantially as described.

9. In an apparatus for making rims, the combination of hollow sections constructed to jointly form a circular female die having interior heat-passages, and an annularly uniformly-expansible male die consisting of a ring of metal divided at one point and means applied at such divided point to thrust the ends of the ring asunder, substantially as described.

In testimony whereof we have signed our names to this specification in the presence of two subscribing witnesses.

WILLIAM W. STALL.
JAMES T. WALTON.

Witnesses:
C. A. BARTLETT,
H. B. CHAPMAN.